(12) United States Patent
Cunningham et al.

(10) Patent No.: US 8,506,653 B2
(45) Date of Patent: Aug. 13, 2013

(54) AQUEOUS DIRECT DYE FORMULATIONS

(75) Inventors: Allan Francis Cunningham, Magden (CH); Céline Hossenlopp, Mulhouse (FR); Heinz Schneider, Muttenz (CH); Rainer Hans Traber, Reinach (CH); Horst Herrmann, Lörrach (DE); Michael Jacquier, Binzen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/202,127

(22) PCT Filed: Mar. 11, 2010

(86) PCT No.: PCT/EP2010/053136
§ 371 (c)(1),
(2), (4) Date: Sep. 30, 2011

(87) PCT Pub. No.: WO2010/103087
PCT Pub. Date: Sep. 16, 2010

(65) Prior Publication Data
US 2012/0005845 A1    Jan. 12, 2012

(30) Foreign Application Priority Data
Mar. 13, 2009 (EP) .................................... 09155187

(51) Int. Cl.
*D06P 3/62* (2006.01)

(52) U.S. Cl.
USPC ................ 8/641; 8/636; 8/585; 8/602; 8/638; 162/162

(58) Field of Classification Search
USPC .......................................................... 8/636
See application file for complete search history.

(56) References Cited

U.S. PATENT DOCUMENTS

| 6,423,183 B1 * | 7/2002 | Goulet et al. ................. 162/182 |
| 2003/0164475 A1 | 9/2003 | Malisz et al. |
| 2008/0295262 A1 | 12/2008 | Klopp |

FOREIGN PATENT DOCUMENTS

| CH | 642100 A5 | 3/1984 |
| EP | 1258562 A | 11/2002 |
| EP | 1548069 A | 6/2005 |
| WO | 01/90257 A | 11/2001 |
| WO | 2007/057370 A | 5/2007 |
| WO | WO 2007057370 A2 * | 5/2007 |

OTHER PUBLICATIONS

English text machine translation of WO 2007.057370 to Klopp et al., accessed on Espacenet on Sep. 23, 2012.*
English Language Abstract of EP 1548069 Jun. 29, 2005.
English Language Abstract of CH 642100 Mar. 30, 1984.
English Language Abstract of EP 1258562 Nov. 20, 2002.

* cited by examiner

*Primary Examiner* — Harold Pyon
*Assistant Examiner* — Katie L Hammer
(74) *Attorney, Agent, or Firm* — Shiela A. Loggins

(57) ABSTRACT

The present invention relates to an aqueous direct dye formulation, comprising (a) 5 to 25% by weight of a dye composition comprising (a1) 50-99% by weight of one or more dyes obtainable by reduction or thermal treatment of Direct Yellow 11, and (a2) 1-50% by weight of a blue, black and/or red direct dye, (all based on the dye composition); (b) up to 0.9% by weight of a saturated, cyclic or acyclic water-soluble amine comprising a primary, secondary or tertiary amino group and at least one further functional group selected from primary, secondary and tertiary amino groups, OH groups and ether groups; and (c) up to 0.9% by weight of urea; and (d) water, wherein the percentages for (a), (b), and (c) relate to the total weight of the aqueous direct dye formulation. The invention moreover relates to a process for their preparation and the use thereof for the dyeing, in particular of paper, as well as paper which has been dyed with this aqueous direct dye formulation.

9 Claims, No Drawings

AQUEOUS DIRECT DYE FORMULATIONS

The present invention relates to aqueous direct dye formulations, a process for their preparation and the use thereof for dyeing, in particular of paper.

The manufacture of packaging material requires brown dyes having a light brown hue which does not vary much. The brown dye is commonly a synthesized mixture of dyes or a blended mixture of a yellow dye and a blue dye with or without a red dye. Blended dye mixtures have the great advantage that it is easier to adjust the brown hue. It is, however, more difficult to obtain storage-stable liquid formulations of these blended dye mixtures.

Poor storage stability of a liquid formulation often results from the limited solubility of dyes in water, since limited solubility in water is usually a direct consequence of the desired high affinity for fibers. While this has no repercussion in the papermaking machine because the dye concentration is low, it can have harsh consequences for the very popular commercially liquid formulations. The poor storage stability of the liquid formulations often gives rise to problems when the drums have to be stored for a long period. During this time, both low and high temperatures can result in precipitates which can block metering pumps but can also lead to specks or nonuniform colorations on paper. Storage stability is even a greater problem in the case of a blended dye mixture, since in this case more than one dye has to be kept in solution at one and the same time.

Dye formulation solubility is generally improved by addition of solubility improvers which often also serve as a counterion to the dye acids. Known solubility improvers can belong to various types of chemical compounds such as alcohols, mono-oligo- or polyakylene glycols, lactams, amines and amides.

EP 1 548 069 describes aqueous liquid formulations comprising
5-25% by weight of a dye composition comprising
    70-95% by weight of a dye obtainable by reduction or thermal treatment of Direct Yellow 11;
    5-30% by weight of a blue direct dye and
    0-20% by weight of a red direct dye;
    (all based on the dye composition)
1-15% by weight of a saturated, cyclic or acyclic water-soluble amine comprising a primary, secondary or tertiary amino group and at least one further functional group selected from primary, secondary and tertiary amino groups, OH groups and ether groups, and 1-25% by weight of urea.

The presence of such amounts of water-soluble amines and urea is however disadvantageous in that these substances end up in waste water from which they have to be removed or biologically degraded to allow proper disposal.

An object of the present invention is therefore the provision of storage stable aqueous direct dye formulations in which the amount of water-soluble amines and/or urea is lower than in known aqueous direct dye formulations.

This object is achieved according to the present invention by an aqueous direct dye formulation, comprising
(a) 5 to 25% by weight of a direct dye composition comprising
    (a1) 50-99% by weight of one or more dyes obtainable by reduction or thermal treatment of Direct Yellow 11, and
    (a2) 1-50% by weight of a blue, black and/or red direct dye,
    (all based on the dye composition)
(b) up to 0.9% by weight of a saturated, cyclic or acyclic water-soluble amine comprising a primary, secondary or tertiary amino group and at least one further functional group selected from primary, secondary and tertiary amino groups, OH groups and ether groups, and
(c) up to 0.9% by weight of urea; and
(d) water,
wherein the percentages for (a), (b), and (c) relate to the total weight of the aqueous direct dye formulation.

The black, red or blue direct dye is in general an anionic direct dye. Blue refers to an absorption maximum in the wavelength range from 560 to 650 nm. Red refers to an absorption maximum in the wavelength range from 490 to 540 nm and black refers to significant absorption over the entire visible spectrum.

Preferably, the direct dye composition comprises as component (a2) 1 to 30% by weight of a blue or black direct dye and/or 0 to 20% by weight of a red direct dye, based on the dye composition.

Examples of red direct dyes particularly appropriate for the present invention are Direct Red 80, 81, 239, 253, 254 and 262. Moreover, it is preferred that the red dye is either Direct Red 81, 239 or 254.

Preferred examples of blue direct dyes suitable for the present invention include Direct Blue 71, 199, 218, 267, 273 and its copper complex, 279, 281, 290 and 301. More preferred blue dyes are Direct Blue 290 and Direct Blue 301.

Examples of black dyes useful for the present invention include Direct Black 19, 22, 54, 80, 112, 154, 155, 159, 161, 162, 168, 169 and 171. Preferably, Direct Black 19 and Direct Black 168 are employed.

In a very particularly preferred embodiment of the present invention, at least one of dyes (a1) and (a2) has been purified by nanofiltration or ultrafiltration, whereby nanofiltration has been carried out with a polymeric nanofiltration membrane or ultrafiltration has been carried out with a polymeric or ceramic membrane with a cutoff at 1000 to 5000 Dalton. Preferably, a nanofiltration polyether sulfone membrane operating at 30-65° C. and 10-35 bars is used. In this respect, it is of particular advantage when dye(s) (a1) has been purified by nanofiltration. Nanofiltration allows in a particular easy and efficient manner to obtain the stable aqueous direct dye formulations of the present invention.

In the aqueous direct dye formulation of the present invention, the saturated, cyclic or acyclic water-soluble amine (b) used in the synthesis of the reduced or thermally treated Direct Yellow 11 or its derivatives is preferably almost completely removed by nanofiltration and is preferably present in an amount of not more than 0.9% by weight of the total weight of the aqueous direct dye formulation. More particularly, the saturated, cyclic or acyclic water-soluble amine (b) is present in an amount of 100 ppm to 0.1% by weight of the total weight of the aqueous direct dye formulation.

In a preferred embodiment, the aqueous direct dye formulation comprises
(e) one or more preservatives in an amount of 100 to 500 ppm.

Preservatives (to be referred to also as "biocides") used in embodiments of the present invention are in general used to protect the aqueous dye dispersions against microorganisms. Particularly preferred biocides used according to the present invention are 2-methyl-2H-isothiazol-3-one and 1,2-benzisothiazole-3(2H)-one, alone or in combination.

The aqueous direct dye formulation has preferably a low sulfate content. The sulfate content is preferably lower than 0.5% by weight, more preferably lower than 0.3% by weight and most preferred lower than 0.1% by weight, based on the total weight of the aqueous direct dye formulation.

The direct dyes are present in the aqueous direct dye formulation in general in the form of their salts. The dye obtained by reaction of Direct Yellow 11 preferably has alkali metal ions such as sodium, potassium and especially lithium ions as counter-ions.

Direct Yellow 11 is a stilbene dye which is preferably obtained as product of the self-condensation of 4-nitro-2-toluenesulfonic acid in an aqueous alkaline medium. Its reaction with reducing agents such as glucose or sodium sulfide provides a variety of dyestuffs having redder shades including Direct Orange 15 (C.I. 40002/40003). All these dyes are mixtures of dyes of uncertain constitution. Direct Orange 15 is a mixture whose CIELAB hue angle on bleached cellulose varies in the range of from 45 to <55 in the color space. Reducing Direct Yellow 11 with varying amounts of glucose or other reducing agents with regard to the nitrotoluenesulfonic acid or treating it thermally gives dye mixtures with shades ranging from a hue angle of 75, when little reducing agent is used, to 45 with higher amounts of reducing agent. This bathochromic shift in the hue is also referred to as the "reddening" of Direct Yellow 11. Preferred are yellowish orange dyes (so-called partially reddened dyes) which are obtainable by reduction or thermal treatment of Direct Yellow 11 and whose hue angle on bleached cellulose is in the range of from 55 to 75.

Preference is given to aqueous direct dye formulations whose dye composition comprises 70-99% by weight of one or more dyes obtainable by reduction or thermal treatment of Direct Yellow 11, 1-30% by weight of a blue direct dye or black direct dye and/or 0-20% by weight of a red direct dye; based on the direct dye composition.

Particularly preferred are aqueous direct dye formulations whose dye composition comprises 70-99% by weight of partially reddened Direct Yellow 11, 1-15% by weight of a blue or black direct dye and 0-10% by weight of a red direct dye, based on the dye composition.

Very particular preference is given to aqueous direct dye formulations whose dye composition comprises
70-99% by weight of a dye obtainable by reduction or thermal treatment of Direct Yellow 11, preferably partially reddened Direct Yellow 11;
1-15% by weight of a dye selected from Direct Blue 15, 273, 279, 281, 290, 301 or Direct Black 19, 168; and
0-10% by weight of a dye selected from Direct Red 81, 239 and 254.

A reddening of Direct Yellow 11 is obtained for example by reacting it with formaldehyde or by basic condensation of 4-nitro-2-toluenesulfonic acid in the presence of formaldehyde. Reddening is furthermore achieved by adding glucose or sodium sulfide. Further reddening reactions are to be found in the Colour Index and its literature references to the dyes C.I. 40001, 40002, 40003.

Preferably used are dyes which are obtained by reacting Direct Yellow 11 with an organic reducing agent like for example hydroxyl aldehydes such as pentoses, hexoses and heptoses, preferably glucose. The preferred partially reddened dyes are obtainable by substoichiometric reduction based on nitrotoluenesulfonic acid.

Particularly preferred partially reddened dyes are obtained by reaction of Direct Yellow 11 with 0.005-0.15 mol of hydroxyl aldehyde, especially glucose, per mole of nitrotoluenesulfonic acid used. When the desired hue is attained, the reddening reaction may be stopped by neutralizing and cooling.

The synthesis of Direct Yellow 11 is known. Direct Yellow 11 is in general obtained by heating an alkaline aqueous solution of nitrotoluenesulfonic acid. The reaction of nitrotoluenesulfonic acid with an alkali metal hydroxide such as sodium hydroxide or preferably lithium hydroxide first produces the salt of nitrotoluenesulfonic acid, and it condenses on heating to 40-80° C. in the basic medium to form the azo stilbene dye.

Prior to the condensation reaction, the mixture can be admixed with a water-soluble amine, preferably an alkanolamine, in an amount of 0.1 to 1.0 mol of alkanolamine per mole of nitrotoluenesulfonic acid. Suitable alkanolamines are for example ethanolamine, isopropanolamine or preferably diethanolamine. It is believed that such an addition has a solubilizing effect on reaction intermediates.

After condensation and cooling, the alkaline mixture is neutralized in general, for example with acetic or sulfuric acid, to a pH in the range of from 7 to 9.

Preferably, the fully or partially reddened dye is prepared using a Direct Yellow 11 which is obtainable by reacting 1 mol of nitrotoluenesulfonic acid with 1.4 to 2.0 mol of lithium hydroxide, most preferably 1.6 to 1.9 moles, addition of 0.1 to 1.0 mol of alkanolamine, heating the reaction mixture to 40-80° C. and neutralizing.

The water-soluble amine is preferably diethanolamine with or without one or more additional amines, especially an alkanolamine. In a first embodiment, the water-soluble amine comprises at least >90% by weight, based on the total amount of water-soluble amine, of diethanolamine. In another preferred embodiment, the water-soluble amine comprises 60% to 90% by weight of diethanolamine and 10% to 40% by weight of a water-soluble amine other than diethanolamine.

In a particularly preferred mode, the synthesis of Direct Yellow 11 and the reddening step are carried out without intervening isolation of Direct Yellow 11. The partially reddened dye is then obtainable directly by reaction of 1 mol of nitrotoluenesulfonic acid with 1.4 to 2.0 mol of lithium hydroxide, addition of 0.1 to 1.0 mol of alkanolamine, heating the reaction mixture to 40-80° C., reacting with 0.005 to 0.15 mol of glucose, based on one mole of nitrotoluenesulfonic acid used and neutralization.

The temperature is preferably kept constant or raised continuously, in a linear or nonlinear manner, or periodically during coupling and reduction. The temperature difference between the start of the coupling reaction and the end of the reduction reaction may be up to 40° C. Generally, this difference is in the range of from 0 to 25° C.

Preferred aqueous direct dye formulations comprise 10-25% by weight of the direct dye composition, up to 0.9% by weight of the water-soluble amine and up to 0.9% by weight of urea, based on the total weight of the aqueous formulation, wherein the total amount of watersoluble amine and urea does preferably not exceed 1% by weight. Particular preference is given to aqueous liquid formulations comprising 15-20% by weight of the direct dye composition, up to 0.2% by weight of the water-soluble amine, preferably 0.01-0.2% by weight and most preferably 0.01-0.1% by weight, and up to 0.75% by weight of urea, preferably 0.01-0.75% by weight, most preferred 0.01-0.1% by weight. Also preferred embodiments are aqueous direct dye formulations containing dyestuffs that can be formulated completely free of urea, for example containing 0-0.75% urea, e.g. when using no blue dyestuffs.

The Direct Yellow 11 derivatives used in the aqueous direct dye formulation of the present invention are preferably nanofiltrated. Optionally, other dyes in the dye composition can be nanofiltrated. Nanofiltration is in general carried out directly after the synthesis and serves to remove salts and organic materials of low molecular weight. This is accomplished by bringing the crude dye solution in contact with a suitable membrane allowing passage of substances having molecular weights between 300 and 2000 Daltons at a specific temperature and pressure. Once the desired composition is attained, nanofiltration is continued until the targeted dye concentration is obtained.

As a result of nanofiltration, derivatives of Direct Yellow 11 obtained by the reduction or thermal treatment process described above can be obtained that contain <0.2% by weight sulfate ion and <0.2% by weight diethanolamine. Surprisingly it was found that very stable direct dye formulations can be obtained with these Direct Yellow 11 derivatives purified by nanofiltration without use of additional formulation aids such as $C_1$-$C_4$-alkanols, carboxamides, ketones or keto alcohols, mono-, oligo- or polyalkylene glycols or thioglycols, $C_1$-$C_4$-alkyl ethers of polyhydric alcohols or $C_1$-$C_4$-alkyl esters of polyhydric alcohols. Other commonly used additives include lactams, cyclic ureas, polyacrylic acids, polyacrylic acid derivatives, polyvinyl acetates, polyvinyl alcohols, polyinylpyrrolidones, polysiloxanes, copolymers of the respective monomers as well as oligomers of ethylene oxide or propylene oxide or derivatives thereof.

The invention is moreover directed to a process for the preparation of dye formulations, which comprises mixing a2) 1-50% by weight of a blue, black and/or red direct dye to a1) 50-99% by weight of a dye or mixture of dyes obtainable by reduction or thermal treatment of Direct Yellow 11, and, optionally, water,
wherein the percentages for (a1) and (a2) relate to the total weight of the aqueous direct dye formulation.

In addition, the present invention is directed to the use of the aqueous direct dye formulation described herein for the dying of paper.

Finally, the present invention is directed to paper, which has been dyed with an aqueous direct dye formulation, as defined herein.

The direct dye formulations of the present invention have excellent stability in storage. They provide good paper coloration especially in the pulp. It is of particular advantage that there may be less organic material in the waste water of paper mills. Namely, the invention allows reducing the amount of additives like, for example, amines and urea that wind up in waste water from which they have to be removed by an elaborate treatment.

EXAMPLES

The following Examples illustrate the invention without intending to be restrictive in nature. Parts and percentages are by weight unless otherwise stated.

The direct dyes used in the following Examples 1 to 13 were obtained by customary procedures via condensation of 4-nitro-2-toluene sulfonic acid and reduction. Thereafter, the reaction mixture was submitted to nanofiltration. Nanofiltration is generally carried out by diluting the crude dye solution with 0.5 volume (half the volume of the dye solution) of deionized water, then bringing this solution in contact with a polyether sulfone membrane NTR-7430 at 50° C. and 25 bars pressure. Approximately 1-2 volumes of deionized water are required for this process to remove salts and byproducts. Once the desired salt levels are attained, nanofiltration is continued until the proper color strength is obtained.

Example 1

Synthesis of Direct Orange 15 (DOR 15)

3.1 kg LiOH.1H$_2$O was added to 39.5 kg 40% 4-nitro-2-toluene sulfonic acid containing approximately 2% of sulfuric acid in a steel vessel followed by 6.2 kg diethanol amine. This solution was then added to a solution of 3.1 kg LiOH.1H$_2$O in 20 kg deionized water in a second steel vessel at a temperature of 70-75° C. over a period of 2 hours then stirred for an additional 3 hours at 70-75° C. At this time a solution of 1.6 kg glucose.1H$_2$O in 9.0 kg water was quickly added to the reaction mixture and heating was continued for a further 2 hours at 75° C.

For the nanofiltered material: After cooling, sulfuric acid was added to lower the pH to 8-9. Then the crude reaction mixture was diluted with 40 kg deionized water and nanofiltered as mentioned above to provide 124 kg of a solution of DOR 15 having a diethanolamine content of 0.1% and a sulfate content of <0.1%.

For the comparative examples, not nanofiltered: After cooling, sulfuric acid was added to lower the pH to 10.5. 12.4 kg of urea, 2.5 kg of monoethanolamine and 25.5 kg of water were added to provide 124 kg of DOR 15 containing 10% urea and a total of 7% alcoholamines. Lowering the pH to 9 with either sulfuric or acetic acid did not provide a storage stable dye solution: >1.6% of sediment was formed upon storage at 50° C. for 4 weeks. Brown mixtures based on DOR 15 synthesized according to this procedure are analogous to those claimed in EP 1548069.

Examples 2-13

20.6 g LiOH.1H$_2$O was added to 263 g of 40% 4-nitro-2-toluene sulfonic acid containing approximately 2% of sulfuric acid followed by 0-41.2 g (see Table 1) of diethanolamine. This solution was then added to a solution of 20.6 g LiOH.1H$_2$O in 140 g deionized water at a temperature of 73-77° C. over a period of 2 hours. The reaction mixture was then stirred for an additional 3 h. Then a solution of 0-10.8 g (see table 1) glucose.1H$_2$O in 60 g water was quickly added to the reaction mixture and heating was continued for a further 2 hours at 75° C.

For the nanofiltered material: After cooling, approximately 20 g of sulfuric acid was added to lower the pH to 8-9. Then the crude reaction mixture was diluted with 250 g deionized water and nanofiltered as mentioned above to provide, after concentration, 826 g of a solution of DOR 15 having a diethanolamine content of 0.1% and a sulfate content of <0.1%.

For the comparative examples, not nanofiltered: After cooling, sulfuric acid was added to lower the pH to 10.5. 82.5 g of urea, 1.7 g of monoethanolamine and 198 g of water were added to provide 826 g of dye solutions containing 10% urea and a total of 7% alcoholamines. Brown mixtures based on dyes synthesized according to this procedure are analogous to those claimed in EP 1548069.

In order to determine the coloristic properties of the materials synthesized, a colored sheet was produced in the following manner:

10 g of a 50/50 mixture of fir and ash bleached kraft pulps refined to 22° SR was added to 460 ml tap water and stirred for one hour. The pH was adjusted to 7 by the addition of either hydrochloric acid or sodium hydroxide. The quantity of the specified dye required to obtain a reference depth of 0.2 was added (2.05-2.6%) and stirring continued for 15 minutes. The total volume of the mixture was adjusted to 700 ml by the addition of tap water. 300 ml of the suspension was poured into a Lhomargy sheet former. Water was removed by suction and the resulting sheet was dried between sheets of blotter paper in a cylindrical lab dryer. The blotter paper was then removed and the colored sheet stored in the dark at room temperature for 24 hours before measurement of its color space (CIELAB) with an Elephro 3000 Datacolor spectrometer. The three coordinates of CIELAB are L*, the lightness, a*, the red (+)-green (−) axis, and b*, the yellow (+)-blue (−) axis. The hue angle h* as well as the brilliance C* are derived from a* and b*. For more information on the exact origin of these values, the DIN norms DIN 5033: Farbmessung and DIN 6174: Farbmetrische Bestimmung von Farbmaβzahlen and Farbabständen im angenähert gleichförmigen CIELAB-Farbenraum can be consulted. As can be seen in Table 1, the hue angle of the dye depends strongly upon the amount of diethanolamine and glucose used. Although it is not explicitly shown in the examples, the addition of urea and/or amines at the end of the reaction has no influence on the hue angle.

TABLE 1

| Example | Diethanol-amine (g) | Glucose × H$_2$O (g) | h (hue angle) |
|---|---|---|---|
| 1 | | | 55.2 |
| 2 | 41.2 | 3.24 | 64.9 |
| 3 | 41.2 | 3.24 | 65.1 |
| 4 | 41.2 | 0 | 69.2 |
| 5 | 41.2 | 0 | 69.25 |
| 6 | 41.2 | 1.62 | 67.2 |
| 7 | 20.6 | 0 | 71.3 |
| 8 | 20.6 | 1.62 | 69.55 |
| 9 | 20.6 | 3.24 | 67.1 |
| 10 | 10.3 | 0 | 72.4 |
| 11 | 10.3 | 1.62 | 71.55 |
| 12 | 10.3 | 3.24 | 69.6 |
| 13 | 0 | 0 | 73.7 |

Test for Stability in Storage

The formulations were prepared by combining the dye solutions indicated. Note that the concentrations of the individual dye solutions vary from 11.7-12.7% with the exception of Direct Black 19 which is ~18%. The mixtures thus obtained were left at 50° C. for 4 weeks. The amount of sediment which serves as a measure of storage stability was determined via centrifugation, decantation of the supernatant liquid and determination of the weight of the solid residue. A result of <0.1% indicates that no sedimentation occurs. The results are shown in Table 2. As can be seen from Table 2, stable direct dye formulations can be obtained that contain insignificant amounts of water-soluble amines or urea. Note that of the brown mixtures according to the present invention, only those based on Direct Blue 301 contain urea and, even in this case, less than 0.5% (the commercial form of Direct Blue 301 used contains 5% urea). Thus all new formulations according to the invention contain at most 0.75% urea. A comparison of pairs of Examples 14 and 22, 18 and 21, 19 and 24 and 20 and 23 shows that the formulations according to the present invention are also more stable than the ones according to the state of the art.

TABLE 2

| Example No. | Formulation | Amount of deposit in % after storage for 4 weeks at 50° C. | amine concentration | urea concentration |
|---|---|---|---|---|
| 14 | 86.3% Direct Orange 15 (Example 1 nanofiltered), 5.8% Direct Red 239 5.4% Direct Blue 301 2.5% deionized water | <0.1% | <0.1% | 0.3% |
| 15 | 89.7% Direct Orange 15 (Example 1 nanofiltered), 7.8% Direct Black 168 2.5% deionized water | <0.1% | <0.1% | 0% |
| 16 | 86.3% Direct Orange 15 (Example 1 nanofiltered), 5.8% Direct Red 239 5.4% Direct Black 168 2.5% deionized water | <0.1% | <0.1% | 0% |
| 17 | 89.7% Direct Orange 15 (Example 1 nanofiltered), 7.8% Direct Black 19 2.5% deionized water | <0.1% | <0.1% | 0% |
| 18 | 86.3% Direct Orange 15 (Example 1 nanofiltered), 5.8% Direct Red 239 5.4% Direct Black 19 2.5% deionized water | <0.1% | <0.1% | 0% |
| 19 | 53.0% Direct Orange 15 (Example 1 nanofiltered) 40.5% Example 8 4.0% Direct Blue 301 2.5% deionized water | 0.3% | <0.1% | 0.2% |
| 20 | 53.0% Direct Orange 15 (Example 1 nanofiltered) 40.5% Example 8 nanofiltered 4.0% Direct Black 19 2.5% deionized water | <0.1% | <0.1% | 0% |
| 21* | 86.3% Direct Orange 15 (Example 1 unfiltered) 5.8% Direct Red 239 5.4% Direct Black 19 2.5% deionized water | 1.7% | 6.0% | 8.6% |
| 22* | 86.3% Direct Orange 15 (Example 1 unfiltered) 5.8% Direct Red 239 5.4% Direct Blue 301 2.5% deionized water | 1.8% | 6.0% | 8.9% |
| 23* | 53.0% Direct Orange 15 (Example 1 unfiltered) 40.5% Example 8 unfiltered 4.0% Direct Black 19 2.5% deionized water | 1.0% | 6.5% | 9.4% |
| 24* | 53.0% Direct Orange 15 (Example 1 unfiltered) 40.5% Example 8 unfiltered 4.0% Direct Blue 301 2.5% deionized water | 0.4% | 6.5% | 9.6% |

*Note that the brown mixtures of Examples 21-24 are prepared from reddened Direct Yellow derivatives that contain 10% urea and 7% alcoholamines and are, therefore, analogous to those in EP 1548069.

Preparation of Colored Paper Samples and Measurement of Shade 10 g of a mixture of 70% pine and 30% birch bleached kraft pulps refined to 35° SR was added to 460 ml tap water and stirred for one hour. The pH was adjusted to 7 by the addition of either hydrochloric acid or sodium hydroxide. 1.5% of the specified dye was added and stirring continued for 15 minutes. The total volume of the mixture was adjusted to 700 ml by the addition of tap water. 300 ml of the suspension was poured into a Lhomargy sheet former, and water was removed by suction and the resulting sheet was dried between sheets of blotter paper in a cylindrical lab dryer. The blotter paper was then removed and the colored sheet stored in the dark at room temperature for 24 hours before measurement of its color space (CIELAB) with an Elephro 3000 Datacolor spectrometer. The CIELAB coordinates can be found in Table 3.

TABLE 3

| Example | CIELAB COORDINATES | | | | |
|---|---|---|---|---|---|
| | L* | a* | b* | C* | h* |
| 14, freshly prepared | 68.9 | 16.5 | 27.1 | 31.7 | 58.6 |
| 14, after 1 month at 50° C. | 66.7 | 17.8 | 28.3 | 33.4 | 57.7 |
| 22, freshly prepared | 68.4 | 17.2 | 27.1 | 32.1 | 57.7 |
| 22, after 1 month at 50° C. | 70.7 | 24.7 | 32.7 | 41.0 | 53.0 |
| 18, freshly prepared | 68.6 | 17.6 | 28.5 | 33.5 | 58.4 |
| 18, after 1 month at 50° C. | 66.8 | 17.8 | 28.8 | 33.9 | 58.4 |
| 21, freshly prepared | 69.0 | 18.2 | 28.0 | 33.4 | 57.0 |
| 21, after 1 month at 50° C. | 72.4 | 26.1 | 31.8 | 41.1 | 50.6 |
| 19, freshly prepared | 72.5 | 11.6 | 34.65 | 36.5 | 71.5 |
| 19, after 1 month at 50° C. | 72.4 | 12.3 | 35.4 | 37.4 | 70.8 |
| 24, freshly prepared | 71.85 | 12.5 | 34.2 | 36.4 | 69.9 |
| 24, after 1 month at 50° C. | 73.0 | 15.85 | 36.6 | 39.9 | 66.6 |
| 20, freshly prepared | 73.4 | 11.95 | 35.1 | 37.1 | 71.2 |
| 20, after 1 month at 50° C. | 72.8 | 12.4 | 35.5 | 37.6 | 70.7 |
| 23, freshly prepared | 72.5 | 13.8 | 35.9 | 38.5 | 69.0 |
| 23, after 1 month at 50° C. | 74.5 | 18.7 | 37.5 | 42.0 | 63.5 |

Comparison of the coloristic properties of the relevant papers, 14 vs. 22, 18 vs. 21, 19 vs. 24 and 20 vs. 23, clearly shows that the change in shade upon storage at 50° C. can be minimized through implementation of the present invention. The variation in all the coloristic values is significantly higher with formulations analogous to those in EP 1548069.

The invention claimed is:

1. An aqueous direct dye formulation, comprising
    (a) 5 to 25% by weight of a direct dye composition comprising
        (a1) 50-99% by weight of one or more dyes obtainable by reduction or thermal treatment of Direct Yellow 11, and
        (a2) 1-50% by weight of a blue, black and/or red direct dye,
        (with weight % of (a1) and (a2) based on the direct dye composition (a))
    (b) up to 0.9% by weight of a saturated, cyclic or acyclic water-soluble amine comprising a primary, secondary or tertiary amino group and at least one further functional group selected from primary, secondary and tertiary amino groups, OH groups and ether groups, and
    (c) up to 0.9% by weight of urea; and
    (d) water,
        wherein the percentages for (a), (b), and (c) relate to the total weight of the aqueous direct dye formulation,
        wherein the saturated, cyclic or acyclic water-soluble amine (b) is present in an amount of 100 ppm to 0.1% by weight of the total weight of the aqueous direct dye formulation.

2. The aqueous direct dye formulation of claim 1, wherein (a2) is 1 to 30% by weight of a blue or black direct dye and/or
    0 to 20% by weight of a red direct dye, based on the direct dye composition.

3. The aqueous direct dye formulation of claim 1, wherein at least one of dyes (a1) and (a2) has been purified by nanofiltration or ultrafiltration, whereby nanofiltration has been carried out with a polymer nanofiltration membrane or ultrafiltration has been carried out with a polymer or ceramic membrane with a cutoff at 1000 to 5000 Dalton.

4. The aqueous direct dye formulation of claim 3, wherein dye(s) (a1) has been purified by nanofiltration.

5. The aqueous direct dye formulation of claim 1, comprising 70-99% by weight of one or more dyes obtainable by reduction or thermal treatment of Direct Yellow 11, 1-30% by weight of a blue direct dye or black direct dye and/or 0-20% by weight of a red direct dye; based on the direct dye composition.

6. The aqueous direct dye formulation of claim 1, comprising at least one preservative.

7. A process for the preparation of dye formulations, which comprises mixing a2) 1-50% by weight of a blue, black and/or red direct dye to a1) 50-99% by weight of a dye or mixture of dyes obtainable by reduction or thermal treatment of Direct Yellow 11, and, optionally, water,
    wherein the percentages for (a1) and (a2) relate to the total weight of the aqueous direct dye formulation.

8. A method for dying paper wherein f the paper or pulp forming the paper is treated with the aqueous direct dye formulation of claim 1.

9. Paper, which has been dyed with an aqueous direct dye formulation, as defined in claim 1.

* * * * *